United States Patent
Zhao et al.

(10) Patent No.: US 12,101,249 B2
(45) Date of Patent: Sep. 24, 2024

(54) ROUTE CONFIGURATION METHOD AND ROUTE CONFIGURATION APPARATUS

(71) Applicant: Huawei Technologies Co., Ltd., Shenzhen (CN)

(72) Inventors: Mengkai Zhao, Beijing (CN); Guoqi Xu, Beijing (CN); Song Liu, Beijing (CN); Zhibo Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/969,247

(22) Filed: Oct. 19, 2022

(65) Prior Publication Data

US 2023/0044639 A1    Feb. 9, 2023

Related U.S. Application Data

(63) Continuation of application No. PCT/CN2021/088055, filed on Apr. 19, 2021.

(30) Foreign Application Priority Data

Apr. 20, 2020  (CN) .................. 202010312764.X

(51) Int. Cl.
*G06F 15/173*    (2006.01)
*H04L 45/24*    (2022.01)
(Continued)

(52) U.S. Cl.
CPC .............. *H04L 45/42* (2013.01); *H04L 45/24* (2013.01); *H04L 45/28* (2013.01)

(58) Field of Classification Search
CPC ..................................................... H04L 45/24
See application file for complete search history.

(56) References Cited

U.S. PATENT DOCUMENTS

| 2006/0073835 A1* | 4/2006 | Antoniou | H04W 24/04 |
|---|---|---|---|
| | | | 455/450 |
| 2008/0219153 A1* | 9/2008 | Shand | H04L 45/28 |
| | | | 370/225 |

(Continued)

FOREIGN PATENT DOCUMENTS

| CN | 101232436 A | 7/2008 |
|---|---|---|
| CN | 101651630 A | 2/2010 |

(Continued)

OTHER PUBLICATIONS

S. Previdi, Ed. et al., "IS-IS Extensions for Segment Routing," draft-ietf-isis-segment-routing-extensions-09, Oct. 30, 2016, 41 pages.

(Continued)

*Primary Examiner* — Padma Mundur
(74) *Attorney, Agent, or Firm* — Conley Rose, P.C.

(57) ABSTRACT

A first network device receives an association relationship sent by a second network device, where the association relationship includes an association relationship between a first path and a second path. The first network device generates first routing information between the first network device and a target network device based on the association relationship, where the first routing information is used by the first network device to send a packet to the target network device through the first path, and when a cross-slice condition is met, the first routing information is used by the first network device to send a packet to the target network device through the second path.

20 Claims, 8 Drawing Sheets

(51) Int. Cl.
*H04L 45/28* (2022.01)
*H04L 45/42* (2022.01)

(56) References Cited

U.S. PATENT DOCUMENTS

| | | | |
|---|---|---|---|
| 2012/0020206 A1 | 1/2012 | Busi et al. | |
| 2012/0246273 A1* | 9/2012 | Bornstein | H04L 67/289 709/217 |
| 2015/0229558 A1 | 8/2015 | Liu | |
| 2017/0086118 A1* | 3/2017 | Vrzic | H04W 36/26 |
| 2018/0123960 A1* | 5/2018 | Hu | H04L 47/21 |
| 2019/0124704 A1 | 4/2019 | Sun et al. | |
| 2019/0200286 A1 | 6/2019 | Usui et al. | |
| 2019/0273678 A1 | 9/2019 | Peng et al. | |
| 2020/0145309 A1 | 5/2020 | Soderlund | |
| 2020/0296025 A1 | 9/2020 | Wang | |
| 2023/0033298 A1* | 2/2023 | Peng | H04L 41/5022 |

FOREIGN PATENT DOCUMENTS

| | | |
|---|---|---|
| CN | 101753464 A | 6/2010 |
| CN | 101800702 A | 8/2010 |
| CN | 102164085 A | 8/2011 |
| CN | 102396193 A | 3/2012 |
| CN | 103780482 A | 5/2014 |
| CN | 105247823 A | 1/2016 |
| CN | 107005469 A | 8/2017 |
| CN | 107395425 A | 11/2017 |
| CN | 108965027 A | 12/2018 |
| CN | 109873760 A | 6/2019 |
| CN | 110752952 A | 2/2020 |
| CN | 110752993 A | 2/2020 |
| CN | 110771097 A | 2/2020 |
| EP | 1009191 A2 | 6/2000 |
| WO | 2018019131 A1 | 2/2018 |
| WO | 2018076908 A1 | 5/2018 |
| WO | 2019105066 A1 | 6/2019 |
| WO | 2019192692 A1 | 10/2019 |
| WO | 2020049577 A1 | 3/2020 |

OTHER PUBLICATIONS

P. Psenak, Ed., "IS-IS Extension to Support Segment Routing over IPv6 Dataplane," draft-ietf-lsr-isis-srv6-extensions-07.txt, Mar. 23, 2020, 25 pages.
P. Psenak, Ed et al. "OSPF Extensions for Segment Routing," draft-ietf-ospf-segment-routing-extensions-12, Mar. 8, 2017, 12 pages.
Z. Li, "OSPFv3 Extensions for SRv6," draft-li-ospfv3-srv6-extensions-07, Nov. 4, 2019, 21 pages.
Jing Jiang et al.,"Research and Realization of Fast Reroute Based on MPLS Traffic Engineering," Jan. 2014, 64 pages.

* cited by examiner

ROUTE CONFIGURATION METHOD AND ROUTE CONFIGURATION APPARATUS

CROSS-REFERENCE TO RELATED APPLICATIONS

This is a continuation of International Patent Application No. PCT/CN2021/088055 filed on Apr. 19, 2021, which claims priority to Chinese Patent Application No. 202010312764.X filed on Apr. 20, 2020. The disclosures of the aforementioned applications are hereby incorporated by reference in their entireties.

TECHNICAL FIELD

This disclosure relates to the communications field, and in particular, to a route configuration method and a route configuration apparatus.

BACKGROUND

A flexible algorithm (FlexAlgo) divides a segment routing (SR) network into a plurality of network slices in an algorithm definition manner, to control a forwarding path of a packet according to a service requirement.

Currently, when advertising routing information for reaching a target network device, a first network device carries, in the routing information, information of a target path that is from a second network device to the target network device and that is included in a target network slice. In this way, after the second network device receives the routing information, the second network device sends a packet to the target network device through the target path.

It can be learned from the foregoing solution that the target path is the only available path used by the second network device to send a packet to the target network device, and selection of the available path is simple. Consequently, network transmission performance is poor. For example, when the target path is unavailable or load of the target path is heavy, the packet cannot be forwarded to a destination. Consequently, packet transmission fails, and network transmission performance is reduced.

SUMMARY

Embodiments of this disclosure provide a route configuration method and a route configuration apparatus, to improve a packet transmission success rate and network transmission performance.

A first aspect of embodiments of this disclosure provides a route configuration method. The method is applied to a communications network. The communications network includes a first network slice and a second network slice. The first network slice includes a first path from a first network device to a target network device, and the second network slice includes a second path from the first network device to the target network device. The method includes: The first network device receives an association relationship sent by a second network device, where the association relationship includes an association relationship between the first path and the second path. Then, the first network device generates first routing information between the first network device and the target network device based on the association relationship, where the first routing information is used by the first network device to send a packet to the target network device through the first path, and when a cross-slice condition is met, the first routing information is used by the first network device to send a packet to the target network device through the second path.

In this embodiment, available paths from the first network device to the target network device include a plurality of paths of cross network slices. The first network device sends a packet to the target network device through the first path, and when the cross-slice condition is met, the first network device sends a packet to the target network device through the second path, to improve network transmission performance. For example, when the first path is unavailable, the first network device may send a packet to the target network device through the second path, so that the packet can be successfully forwarded to the target network device, to improve a packet transmission success rate and network transmission performance. According to the method, cross-slice forwarding in a specific condition can be implemented, and resources in a plurality of slices can be fully utilized under a condition of retaining a slice concept, to improve network performance.

In a possible implementation, when the association relationship is used to indicate that the second path is used to perform failure protection on the first path, the cross-slice condition includes that the first path is unavailable. In this possible implementation, the second path is configured, by using the association relationship, to perform failure protection on the first path. In this way, when the first path is unavailable, the first network device may send a packet to the target network device through the second path, to improve a packet transmission success rate and network transmission performance.

In another possible implementation, when the association relationship is used to indicate that the second path is used to perform load balancing on the first path, the cross-slice condition includes that load of the first path is greater than a first preset threshold, or that the first network device receives at least two to-be-transmitted data streams, where destination addresses of the at least two to-be-transmitted data streams are the target network device. In this possible implementation, the second path is configured, by using the association relationship, to perform load balancing on the first path. In this way, when load of the first path is large, or when the first network device receives a plurality of to-be-transmitted data streams whose destination addresses are the target network device, the first network device may send a packet to the target network device through the first path, to avoid a packet transmission failure due to packet congestion on the first path and improve network transmission performance.

In another possible implementation, the association relationship is carried in second routing information sent by the second network device, and the second routing information is used to indicate to send a packet to the target network device through the first path. That the first network device generates first routing information between the first network device and the target network device based on the association relationship includes: the first network device generates the first routing information based on the received second routing information. In this possible implementation, a specific manner of carrying the association relationship is provided. In actual application, feasibility of the solution is improved.

In another possible implementation, the association relationship is carried in configuration information for the first path. That the first network device generates first routing information between the first network device and the target network device based on the association relationship includes: the first network device generates the first routing information based on the association relationship carried in the configuration information and the second routing information, where the second routing information is used to indicate to send a packet to the target network device through the first path. In this possible implementation, another specific manner of carrying the association relationship is provided. In actual application, diversity and feasibility of the solution are improved.

In another possible implementation, the association relationship includes an association relationship between a first identity and a second identity. The first identity is used to identify the target network device in the first network slice, and the first identity corresponds to the first path. The second identity is used to identify the target network device in the second network slice, and the second identity corresponds to the second path. In this possible implementation, the association relationship between the first path and the second path is reflected by using the association relationship between the first identity and the second identity. This provides a specific implementation, and improves feasibility of the solution.

In another possible implementation, the first identity is a first virtual private network segment identity (VPNSid), the second identity is a second VPNSid, and an association relationship between the first VPNSid and the second VPNSid is included in a prefix segment identity attribute type-length-value (Prefix-SID Attribute TLV) field in the second routing information, or in a Segment Routing over Internet Protocol version 6 Services type-length-value (SRv6 Services TLV) field in the second routing information. In this possible implementation, specific forms of the first identity and the second identity are provided, and a specific carrying location of the association relationship between the first VPNSid and the second VPNSid is provided.

In another possible implementation, the first identity is a first locator, the second identity is a second locator, and an association relationship between the first locator and the second locator is included in a locator type-length-value (TLV) field in the configuration information. Alternatively, the first identity is a first prefix segment identity (SID), the second identity is a second prefix SID, and an association relationship between the first prefix SID and the second prefix SID is included in a prefix segment identity type length value (Prefix-SID TLV) field in the configuration information. In this possible implementation, two possible forms of the first identity and the second identity are provided, and a specific carrying location of the association relationship between the first locator and the second locator and a specific carrying location of the association relationship between the first prefix SID and the second prefix SID are provided.

A second aspect of embodiments of this disclosure provides a route configuration method. The method is applied to a communications network. The communications network includes a first network slice and a second network slice. The first network slice includes a first path from a first network device to a target network device, and the second network slice includes a second path from the first network device to the target network device. The method includes: a second network device sends an association relationship to the first network device. The association relationship includes an association relationship between the first path and the second path, and the association relationship is used to indicate the first network device to generate first routing information between the first network device and the target network device based on the association relationship. The first routing information is used by the first network device to send a packet to the target network device through the first path, and when a cross-slice condition is met, the first routing information is used by the first network device to send a packet to the target network device through the second path.

In this embodiment, the second network device sends the association relationship between the first path and the second path to the first network device. The association relationship is used by the first network device to generate the first routing information based on the association relationship. The first routing information is used to indicate the first network device to send a packet to the target network device through the first path, and when the cross-slice condition is met, the first routing information is used to indicate the first network device to send a packet to the target network device through the second path. It can be learned that available paths from the first network device to the target network device include a plurality of paths of cross network slices. This improves network transmission performance. For example, when the first path is unavailable, the first network device may send a packet to the target network device through the second path, so that the packet can be successfully forwarded to the target network device, to improve a packet transmission success rate and network transmission performance. According to the method, cross-slice forwarding in a specific condition can be implemented, and resources in a plurality of slices can be fully utilized under a condition of retaining a slice concept, to improve network performance.

In a possible implementation, when the association relationship is used to indicate that the second path is used to perform failure protection on the first path, the cross-slice condition includes that the first path is unavailable. In this possible implementation, the second path is configured, by using the association relationship, to perform failure protection on the first path. In this way, when the first path is unavailable, the first network device may send a packet to the target network device through the second path, to improve a packet transmission success rate and network transmission performance.

In another possible implementation, when the association relationship is used to indicate that the second path is used to perform load balancing on the first path, the cross-slice condition includes that load of the first path is greater than a first preset threshold, or that the first network device receives at least two to-be-transmitted data streams, where destination addresses of the at least two to-be-transmitted data streams are the target network device. In this possible implementation, the second path is configured, by using the association relationship, to perform load balancing on the first path. In this way, when load of the first path is large, or when the first network device receives a plurality of to-be-transmitted data streams whose destination addresses are the target network device, the first network device may send a packet to the target network device through the first path, to avoid a packet transmission failure due to packet congestion on the first path and improve network transmission performance.

In another possible implementation, that the second network device sends an association relationship to the first network device includes: the second network device sends second routing information to the first network device, where the second routing information carries the association relationship, and the second routing information is used to indicate to send a packet to the target network device through the first path. In this possible implementation, a specific manner of carrying the association relationship is provided. In actual application, feasibility of the solution is improved.

In another possible implementation, that the second network device sends an association relationship to the first network device includes: the second network device sends configuration information for the first path to the first network device, where the configuration information carries the association relationship. In this possible implementation, another specific manner of carrying the association relationship is provided. In actual application, diversity and feasibility of the solution are improved.

In another possible implementation, the association relationship includes an association relationship between a first identity and a second identity. The first identity is used to identify the target network device in the first network slice, and the first identity corresponds to the first path. The second identity is used to identify the target network device in the second network slice, and the second identity corresponds to the second path. In this possible implementation, the association relationship between the first path and the second path is reflected by using the association relationship between the first identity and the second identity. This provides a specific implementation, and improves feasibility of the solution.

In another possible implementation, the first identity is a first VPNSid, the second identity is a second VPNSid, and an association relationship between the first VPNSid and the second VPNSid is included in a Prefix-SID Attribute TLV field in the second routing information, or in an SRv6 Services TLV field in the second routing information. In this possible implementation, specific forms of the first identity and the second identity are provided, and a specific carrying location of the association relationship between the first VPNSid and the second VPNSid is provided.

In another possible implementation, the first identity is a first locator, the second identity is a second locator, and an association relationship between the first locator and the second locator is included in a locator TLV field in the configuration information. Alternatively, the first identity is a first prefix SID, the second identity is a second prefix SID, and an association relationship between the first prefix SID and the second prefix SID is included in a Prefix-SID TLV field in the configuration information. In this possible implementation, two possible forms of the first identity and the second identity are provided, and a specific carrying location of the association relationship between the first locator and the second locator and a specific carrying location of the association relationship between the first prefix SID and the second prefix SID are provided.

A third aspect of embodiments of this disclosure provides a route configuration apparatus. The route configuration apparatus is applied to a communications network. The communications network includes a first network slice and a second network slice. The first network slice includes a first path from the route configuration apparatus to a target network device, and the second network slice includes a second path from the route configuration apparatus to the target network device. The route configuration apparatus includes: a transceiver module, configured to receive an association relationship sent by a second network device, where the association relationship includes an association relationship between the first path and the second path; and a processing module, configured to generate first routing information between the route configuration apparatus and the target network device based on the association relationship, where the first routing information is used by the route configuration apparatus to send a packet to the target network device through the first path, and when a cross-slice condition is met, the first routing information is used by the route configuration apparatus to send a packet to the target network device through the second path.

In a possible implementation, when the association relationship is used to indicate that the second path is used to perform failure protection on the first path, the cross-slice condition includes that the first path is unavailable.

In another possible implementation, when the association relationship is used to indicate that the second path is used to perform load balancing on the first path, the cross-slice condition includes that load of the first path is greater than a first preset threshold, or that the route configuration apparatus receives at least two to-be-transmitted data streams, where destination addresses of the at least two to-be-transmitted data streams are the target network device.

In another possible implementation, the association relationship is carried in second routing information sent by the second network device, and the second routing information is used to indicate to send a packet to the target network device through the first path; and the processing module is configured to: generate the first routing information based on the received second routing information.

In another possible implementation, the association relationship is carried in configuration information for the first path, and the processing module is configured to: generate the first routing information based on the association relationship carried in the configuration information and second routing information, where the second routing information is used to indicate to send a packet to the target network device through the first path.

In another possible implementation, the association relationship includes an association relationship between a first identity and a second identity. The first identity is used to identify the target network device in the first network slice, and the first identity corresponds to the first path. The second identity is used to identify the target network device in the second network slice, and the second identity corresponds to the second path.

In another possible implementation, the first identity is a first VPNSid, the second identity is a second VPNSid, and an association relationship between the first VPNSid and the second VPNSid is included in a Prefix-SID Attribute TLV field in the second routing information, or in an SRv6 Services TLV field in the second routing information.

In another possible implementation, the first identity is a first locator, the second identity is a second locator, and an association relationship between the first locator and the second locator is included in a locator TLV field in the configuration information. Alternatively, the first identity is a first prefix SID, the second identity is a second prefix SID, and an association relationship between the first prefix SID and the second prefix SID is included in a Prefix-SID TLV field in the configuration information.

A fourth aspect of embodiments of this disclosure provides a route configuration apparatus. The route configuration apparatus is applied to a communications network. The communications network includes a first network slice and a second network slice. The first network slice includes a first path from a first network device to a target network device, and the second network slice includes a second path from the first network device to the target network device. The route configuration apparatus includes a transceiver module, configured to send an association relationship to the first network device. The association relationship includes an association relationship between the first path and the second path, and the association relationship is used to indicate the first network device to generate first routing information between the first network device and the target network device based on the association relationship. The first routing information is used by the first network device to send a packet to the target network device through the first path, and when a cross-slice condition is met, the first routing information is used by the first network device to send a packet to the target network device through the second path.

In a possible implementation, when the association relationship is used to indicate that the second path is used to perform failure protection on the first path, the cross-slice condition includes that the first path is unavailable.

In another possible implementation, when the association relationship is used to indicate that the second path is used to perform load balancing on the first path, the cross-slice condition includes that load of the first path is greater than a first preset threshold, or that the first network device receives at least two to-be-transmitted data streams, where destination addresses of the at least two to-be-transmitted data streams are the target network device.

In another possible implementation, the transceiver module is configured to: send second routing information to the first network device, where the second routing information carries the association relationship, and the second routing information is used to indicate to send a packet to the target network device through the first path.

In another possible implementation, the transceiver module is configured to: send configuration information for the first path to the first network device, where the configuration information carries the association relationship.

In another possible implementation, the association relationship includes an association relationship between a first identity and a second identity. The first identity is used to identify the target network device in the first network slice, and the first identity corresponds to the first path. The second identity is used to identify the target network device in the second network slice, and the second identity corresponds to the second path.

In another possible implementation, the first identity is a first VPNSid, the second identity is a second VPNSid, and an association relationship between the first VPNSid and the second VPNSid is included in a Prefix-SID Attribute TLV field in the second routing information, or in an SRv6 Services TLV field in the second routing information.

In another possible implementation, the first identity is a first locator, the second identity is a second locator, and an association relationship between the first locator and the second locator is included in a locator TLV field in the configuration information. Alternatively, the first identity is a first prefix SID, the second identity is a second prefix SID, and an association relationship between the first prefix SID and the second prefix SID is included in a Prefix-SID TLV field in the configuration information.

A fifth aspect of embodiments of this disclosure provides a route configuration apparatus. The route configuration apparatus includes a processor, a memory, an input/output device, and a bus. The memory stores computer instructions. When the processor executes the computer instructions in the memory, the memory stores the computer instructions. When executing the computer instructions in the memory, the processor is configured to implement any one of the implementations of the first aspect.

In a possible implementation of the fifth aspect, the processor, the memory, and the input/output device are separately connected to the bus.

A sixth aspect of embodiments of this disclosure provides a route configuration apparatus. The route configuration apparatus includes a processor, a memory, an input/output device, and a bus. The memory stores computer instructions. When the processor executes the computer instructions in the memory, the memory stores the computer instructions. When executing the computer instructions in the memory, the processor is configured to implement any one of the implementations of the second aspect.

In a possible implementation of the sixth aspect, the processor, the memory, and the input/output device are separately connected to the bus.

A seventh aspect of embodiments of this disclosure provides a computer program product including instructions. When the computer program product runs on a computer, the computer is enabled to perform any one of the implementations of the first aspect or the second aspect.

An eighth aspect of embodiments of this disclosure provides a computer-readable storage medium including instructions. When the instructions are run on a computer, the computer is enabled to perform any one of the implementations of the first aspect or the second aspect.

A ninth aspect of embodiments of this disclosure provides a network system. The network system includes the route configuration apparatus in the third aspect and the route configuration apparatus in the fourth aspect; or the network system includes the route configuration apparatus in the fifth aspect and the route configuration apparatus in the sixth aspect.

It can be learned from the foregoing technical solutions that embodiments of this disclosure have the following advantages.

It can be learned from the foregoing technical solutions that the first network device receives the association relationship that is between the first path and the second path and that is delivered by the second network device. The first network slice includes the first path from the first network device to the target network device, and the second network slice includes the second path from the first network device to the target network device. Then, the first network device generates the first routing information between the first network device and the target network device based on the association relationship, so that the first network device sends a packet to the target network device through the first path, and when the cross-slice condition is met, the first network device sends a packet to the target network device through the second path. It can be learned that, available paths from the first network device to the target network device include a plurality of paths of cross network slices. The first network device sends a packet to the target network device through the first path, and when the cross-slice condition is met, the first network device sends a packet to the target network device through the second path, to improve network transmission performance. For example, when the first path is unavailable, the first network device may send a packet to the target network device through the second path, so that the packet can be successfully forwarded to the target network device, to improve a packet transmission success rate and network transmission performance.

DESCRIPTION OF EMBODIMENTS

Embodiments of this disclosure provide a route configuration method and a route configuration apparatus, to improve a packet transmission success rate and network transmission performance.

The network architecture described in embodiments of this disclosure is intended to describe the technical solutions in embodiments of this disclosure more clearly, and does not constitute a limitation on the technical solutions provided in embodiments of this disclosure. Persons of ordinary skill in the art may know that, as a network architecture evolves, the technical solutions provided in embodiments of this disclosure are also applicable to a similar technical problem.

The following describes the technical solutions in embodiments of this disclosure with reference to specific application scenarios.

Figure 1:
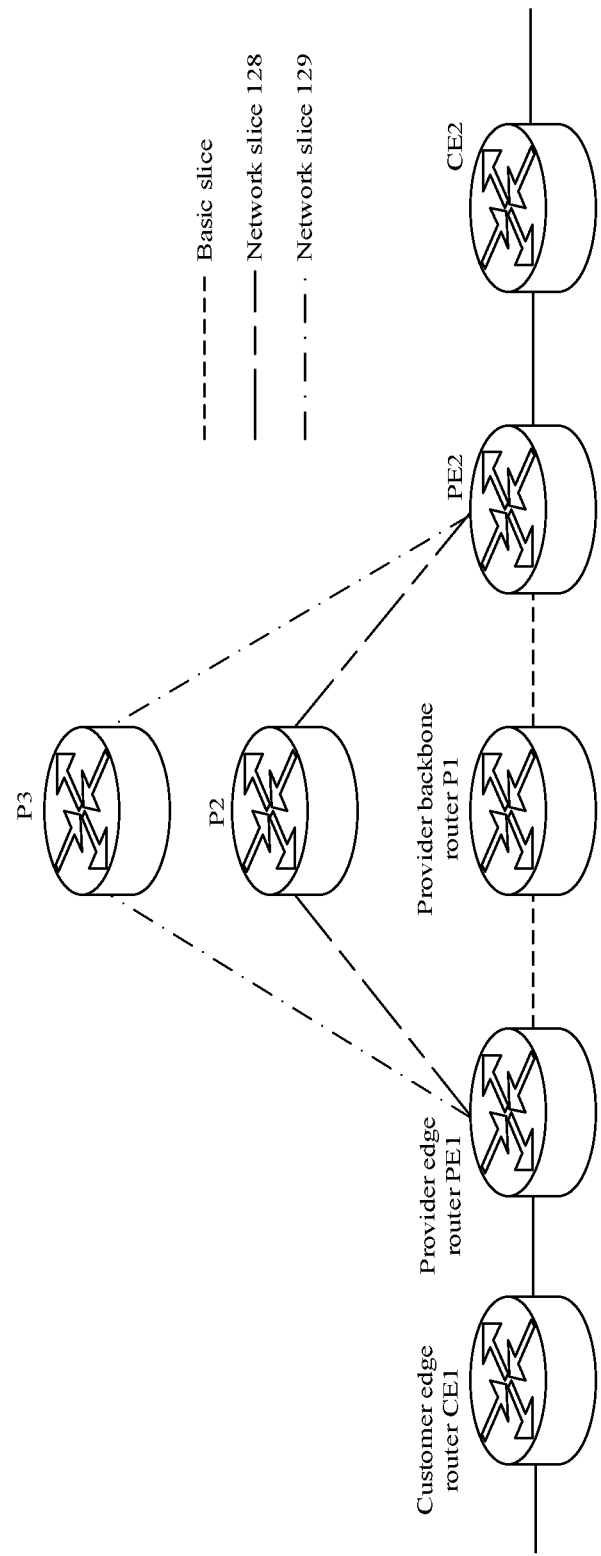
FIG. 1 is a schematic diagram of an application scenario according to an embodiment of this disclosure.

FIG. 1 is a schematic diagram of an application scenario according to an embodiment of this disclosure. Protocols applicable to the application scenario shown in FIG. 1 include the Interior Gateway Protocol (IGP), the Border Gateway Protocol (BGP), and the like. First, the technical solutions in embodiments of this disclosure are described from a perspective of an application scenario in which the application scenario shown in FIG. 1 is an application scenario of routing in a BGP-based private network. A second provider edge router (PE2) may perform routing in the BGP-based private network by using a basic slice, a network slice 128, and a network slice 129. A locator of the basic slice corresponding to a second customer edge (CE2) is 2000::/64, a locator of the network slice 128 corresponding to the CE2 is 3000::/64, and a locator of the network slice 129 corresponding to the CE2 is 3001::/64.

When the PE2 advertises a private network routing information for reaching the CE2, the PE2 generates an association relationship and carries the association relationship in the private network routing information. The association relationship includes an association relationship between a first VPNSid and a second VPNSid, and/or an association relationship between the first VPNSid and a third VPNSid. The first VPNSid is a VPNSid of the network slice 128 corresponding to the CE2, the second VPNSid is a VPNSid of the basic slice corresponding to the CE2, and the third VPNSid is a VPNSid of the network slice 129 corresponding to the CE2. The first VPNSid indicates a first path that is from a first provider edge router (PE1) to the CE2 and that is included in the network slice 128, the second VPNSid indicates a second path that is from the PE1 to the CE2 and that is included in the basic slice, and the third VPNSid indicates a third path that is from the PE1 to the CE2 and that is included in the network slice 129. The second path is used to perform failure protection on the first path. The third path is used to perform load balancing on the first path. To be specific, the association relationships between the paths of the different network slices are reflected by using the association relationships between the VPNSids of the paths of the different network slices corresponding to the CE2. Each VPNSid corresponds to a locator of a network slice. For example, the VPNSid of the network slice 128 corresponding to the CE2 corresponds to the locator 3000::/64, the VPNSid of the basic slice corresponding to the CE2 corresponds to the locator 2000::/64, and the VPNSid of the network slice 129 corresponding to the CE2 corresponds to the locator 3001::/64.

Then, the PE1 receives the private network routing information sent by the PE2, and the PE1 generates first routing information between the PE1 and the CE2 based on the association relationship carried in the private network routing information. The first routing information is used by the PE1 to send a packet to the CE2 through the first path. When the path that is from the PE1 to the CE2 and that is included in the network slice 128 is unavailable, the PE1 sends a packet to the CE2 through the second path. Optionally, the first routing information is further used by the PE1 to send a packet to the CE2 through the third path when load of the path that is from the PE1 to the CE2 and that is included in the network slice 128 is greater than a first preset threshold, or when the PE1 receives at least two to-be-transmitted data streams whose destination addresses are the CE2.

The association relationship may be carried in a Prefix-SID Attribute TLV field in the private network routing information or in an SRv6 Services TLV field in the private network routing information, or may be carried in a newly defined TLV field. This is not limited in this disclosure.

It should be noted that the application scenario shown in FIG. 1 is applicable to an SR network or an SRv6 network. This is not limited in this disclosure. In addition, the BGP-based private network shown in FIG. 1 is a layer 2 virtual private network (L2VPN), a layer 3 virtual private network (L3VPN), or an Ethernet virtual private network (EVPN). This is not limited in this disclosure.

The technical solutions in embodiments of this disclosure are described below from a perspective of an application scenario in which the application scenario shown in FIG. 1 is an application scenario of routing in an IGP-based network. The routing in the IGP-based network is applicable to routing in an IGP public network or routing in an IGP private network. The PE2 may perform routing in the IGP-based network by using a basic slice, a network slice 128, and a network slice 129. A locator of the basic slice corresponding to the CE2 is 2000::/64, a locator of the network slice 128 corresponding to the CE2 is 3000::/64, and a locator of the network slice 129 corresponding to the CE2 is 3001::/64.

The PE2 generates an association relationship, and advertises the association relationship when advertising the locator of the network slice corresponding to the CE2. The association relationship includes an association relationship between a first locator and a second locator, and/or an association relationship between the first locator and a third locator. The first locator is the locator of the network slice 128 corresponding to the CE2, the second locator is the locator of the basic slice corresponding to the CE2, and the third locator is the locator of the network slice 129 corresponding to the CE2. The first locator indicates a first path that is from the PE1 to the CE2 and that is included in the network slice 128, the second locator indicates a second path that is from the PE1 to the CE2 and that is included in the basic slice, and the third locator indicates a third path that is from the PE1 to the CE2 and that is included in the network slice 129. The second path is used to perform failure protection on the first path, and the third path is used to perform load balancing on the first path. To be specific, the association relationships between the paths of the different network slices are reflected by using the association relationships between the locators of the paths of the different network slices corresponding to the CE2.

Then, the PE2 broadcasts the association relationship, and the PE1 receives the association relationship broadcast by the PE2. The PE2 advertises second routing information for reaching the CE2, where the second routing information indicates that the first path is a path reaching the CE2. The PE1 receives the second routing information, and the PE1 generates first routing information based on the second routing information and the association relationship. The first routing information is used by the PE1 to send a packet to the CE2 through the first path. When the path that is from the PE1 to the CE2 and that is included in the network slice 128 is unavailable, the PE1 sends a packet to the CE2 through the second path. Optionally, the first routing information is further used by the PE1 to send a packet to the CE2 through the third path when load of the path that is from the PE1 to the CE2 and that is included in the network slice 128 is greater than a first preset threshold, or when the PE1 receives at least two to-be-transmitted data streams whose destination addresses are the CE2.

It should be noted that the application scenario shown in FIG. 1 is applicable to an SR network or an SRv6 network. This is not limited in this disclosure. In addition, in the foregoing IGP-based network, the IGP is the Intermediate System to Intermediate System (ISIS) Protocol or the Open Shortest Path First (OSPF) Protocol. This is not limited in this disclosure.

Figure 2:
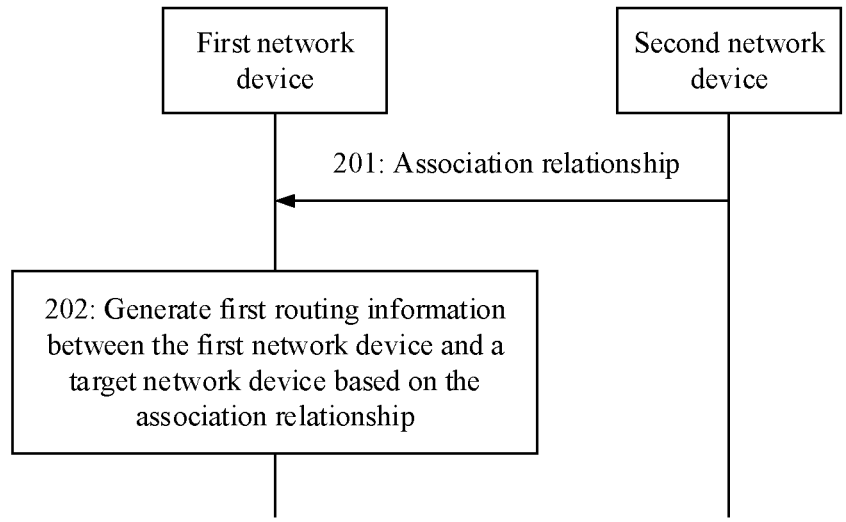
FIG. 2 is a schematic diagram of an embodiment of a route configuration method according to an embodiment of this disclosure.

FIG. 2 is a schematic diagram of an embodiment of a route configuration method according to an embodiment of this disclosure. In FIG. 2, the method includes the following steps.

201: A first network device receives an association relationship sent by a second network device.

This embodiment of this disclosure is applied to a communications network, and the communications network device includes a first network slice and a second network slice. The first network slice includes a first path from a first network device to a target network device, and the second network slice includes a second path from the first network device to the target network device. The association relationship includes an association relationship between the first path and the second path.

For example, as shown in FIG. 1, the first network slice is the network slice 128, and the second network slice is the basic slice. The network slice 128 includes a first path from the PE1 to the CE2. To be specific, the first path is PE1-second provider backbone router (P2)–PE2. The basic slice includes a second path from the PE1 to the CE2. To be specific, the second path is PE1-first provider backbone router (P1)-PE2. The first path and the second path are two cross-slice paths.

The association relationship may be carried in any one of the following manners:

1. The association relationship is carried in second routing information sent by the second network device to the first network device.

The second routing information is used to indicate to send a packet to the target network device through the first path.

2. The association relationship is carried in configuration information that is for the first path and that is sent by the second network device.

The foregoing two carrying manners correspond to two specific application scenarios in step 201, and are described in detail with reference to the embodiments shown in FIG. 3A and FIG. 4A. Details are not described herein again.

In a possible implementation, the association relationship is used to indicate that the second path is used to perform failure protection on the first path.

For example, as shown in FIG. 1, the first network slice is the network slice 128, and the second network slice is the basic slice. When a first path that is from the PE1 to the CE2 and that is included in the network slice 128 is unavailable, the PE1 sends a packet to the CE2 through a second path that is from the PE1 to the CE2 and that is included in the basic slice, to implement successful packet transmission. To be specific, the second path that is from the PE1 to the CE2 and that is included in the basic slice plays a role of performing failure protection on the first path that is from the PE1 to the CE2 and that is included in the network slice 128.

In another possible implementation, the association relationship is used to indicate that the second path is used to perform load balancing on the first path.

For example, as shown in FIG. 1, the first network slice is the network slice 128, and the second network slice is the network slice 129. When load of a first path that is from the PE1 to the CE2 and that is included in the network slice 128 is greater than a first preset threshold, or when the PE1 receives at least two to-be-transmitted data streams whose destination addresses are the CE2, the PE1 sends a packet to the CE2 through a second path that is from the PE1 to the CE2 and that is included in the network slice 129, to avoid a packet transmission failure due to packet congestion and improve network transmission performance. To be specific, the second path that is from the PE1 to the CE2 and that is included in the network slice 129 plays a role of sharing load of the first path that is from the PE1 to the CE2 and that is included in the network slice 128.

The first network device is a router, a switch, or the like, for example, a PE router. The second network device is a controller, a switch, or a router, for example, a PE router. The target network device is a router, for example, a CE router.

In this embodiment, that the first path is unavailable includes any one or more of the following:

1. A failure occurs in a connection link between node devices on the first path.

For example, the first path is PE1-P2-PE2, and a failure occurs in a connection link between the PE1 and the P2.

2. A failure occurs in a node device on the first path.

For example, the first path is PE1-P2-PE2, and a failure occurs in the node device P2.

Optionally, the association relationship includes an association relationship between a first identity and a second identity. The first identity is used to identify the target network device in the first network slice, the first identity corresponds to the first path, the second identity is used to identify the target network device in the second network slice, and the second identity corresponds to the second path.

The association relationship between the first path and the second path is reflected by using the association relationship between the first identity and the second identity. Specific forms of the first identity and the second identity should be embodied with reference to specific application scenarios, and are described in detail in subsequent embodiments shown in FIG. 3A and FIG. 4A. Details are not described herein again.

Based on the foregoing manner in which the association relationship is used to indicate that the second path is used to perform failure protection on the first path, optionally, the association relationship is further used to indicate that a third path is used to perform load balancing on the first path. A third network slice includes the third path from the first network device to the target network device.

For example, as shown in FIG. 1, the first network slice is the network slice 128, the second network slice is the basic slice, and the third network slice is the network slice 129. A third path is a path that is from the PE1 to the CE2 and that is included in the network slice 129. To be specific, the third path is PE1-third provider backbone router (P3)-PE2. The PE1 sends a packet to the CE2 through the first path that is from the PE1 to the CE2 and that is included in the network slice 128. When the first path is unavailable, the PE1 sends a packet to the CE2 through the second path that is from the PE1 to the CE2 and that is included in the basic slice. When load of the first path is greater than a first preset threshold, or when the PE1 receives at least two to-be-transmitted data streams whose destination addresses are the CE2, the PE1 sends a packet to the CE2 through the third path that is from the PE1 to the CE2 and that is included in the network slice 129.

It can be learned that, for the first path included in the network slice 128, both the second path used to perform failure protection on the first path and the third path used to perform load balancing on the first path are configured. This avoids a packet transmission failure when the first path is unavailable, and also avoids a packet transmission failure or a low packet transmission rate due to packet congestion on the first path, to further improve a packet transmission success rate and network transmission performance.

In embodiments of this disclosure, any one or more of the first network slice, the second network slice, and the third network slice are FlexAlgo slices. To be specific, the technical solutions in embodiments of this disclosure are applied to a scenario of cross-slice packet forwarding between FlexAlgo slices in a FlexAlgo scenario, are also applicable to a scenario of cross-slice packet forwarding between network slices of another type in another scenario, and are further applicable to a scenario of cross-slice packet forwarding between a FlexAlgo slice and a network slice of another type. This is not limited in this disclosure. For example, the first network slice and the third network slice are FlexAlgo slices, the second network slice is a basic slice, and a protocol used by the basic slice is the IGP protocol or the BGP protocol depending on an actual application scenario. Therefore, the technical solutions in embodiments of this disclosure are applicable provided that a similar technical problem exists between network slices in another scenario. In the subsequent embodiment, an example in which the second network slice is a basic slice, and the first network slice and the third network slice are FlexAlgo slices is used for description.

202: The first network device generates first routing information between the first network device and the target network device based on the association relationship.

The first routing information is used by the first network device to send a packet to the target network device through the first path, and when a cross-slice condition is met, the first routing information is used by the first network device to send a packet to the target network device through the second path.

In a possible implementation, when the association relationship is used to indicate that the second path is used to perform failure protection on the first path, the cross-slice condition includes that the first path is unavailable.

As shown in FIG. 1, the first network slice is the network slice 128, and the second network slice is the basic slice. When the first path that is from the PE1 to the CE2 and that is included in the network slice 128 is unavailable, the PE1 sends a packet to the CE2 through the second path that is from the PE1 to the CE2 and that is included in the basic slice, to implement successful packet transmission and improve a packet transmission success rate and network transmission performance.

In another possible implementation, when the association relationship is used to indicate that the second path is used to perform load balancing on the first path, the cross-slice condition includes that load of the first path is greater than the first preset threshold, or that the first network device receives at least two to-be-transmitted data streams whose destination addresses are the target network device.

For setting of the first preset threshold, refer to any one or more of the following factors: bandwidth of the first path, a delay, and a performance requirement of a data stream.

For example, as shown in FIG. 1, the first network slice is the network slice 128, and the second network slice is the network slice 129. When load of the first path that is from the PE1 to the CE2 and that is included in the network slice 128 is greater than the first preset threshold, or when the PE1 receives the at least two to-be-transmitted data streams whose destination addresses are the CE2, the PE1 sends a packet to the CE2 through the second path that is from the PE1 to the CE2 and that is included in the network slice 129, to avoid a packet transmission failure due to packet congestion and improve network transmission performance.

It should be noted that, in this embodiment, when the first network device receives a plurality of to-be-transmitted data streams, the first network device may enable, in an even sharing manner or in combination of a load status of the first path, the second path to share transmission of these data streams.

For example, as shown in FIG. 1, when the PE1 receives two to-be-transmitted data streams whose destination addresses are CE2, the PE1 may send data of one of the to-be-transmitted data streams to the CE2 through the first path, and the PE1 may send data of the other to-be-transmitted data stream to the CE2 through the third path.

Based on the manner in which the association relationship is used to indicate that the second path is used to perform failure protection on the first path, when the first path is unavailable, the first routing information is used by the first network device to send a packet to the target network device through the second path. Optionally, when load of the first path is greater than the first preset threshold, or when the first network device receives at least two to-be-transmitted data streams whose destination addresses are the target network device, the first routing information is further used by the first network device to send a packet to the target network device through the third path.

In this embodiment of this disclosure, the second network device advertises the association relationship between the first path and the second path. The first network slice includes the first path from the first network device to the target network device, and the second network slice includes the second path from the first network device to the target network device. The first network device receives the association relationship and generates the first routing information between the first network device and the target network device based on the association relationship, so that the first network device sends a packet to the target network device through the first path, and when the cross-slice condition is met, the first network device sends a packet to the target network device through the second path. Therefore, available paths from the first network device to the target network device include a plurality of paths of cross network slices. The first network device sends a packet to the target network device through the first path, and when the cross-slice condition is met, the first network device sends a packet to the target network device through the second path, to improve network transmission performance. For example, when the first path is unavailable, the first network device may send a packet to the target network device through the second path, so that the packet can be successfully forwarded to the target network device, to improve a packet transmission success rate and network transmission performance. According to the method, cross-slice forwarding in a specific condition can be implemented, and resources in a plurality of slices can be fully utilized under a condition of retaining a slice concept, to improve network performance.

Step 201 in the embodiment shown in FIG. 2 has a specific application scenario. The following uses the application scenarios shown in FIG. 3A and FIG. 4A as examples for description. This is also applicable to a scenario that is not shown in embodiments of this disclosure and that has a similar requirement or a same requirement. This is not limited in this disclosure.

Figure 3A:
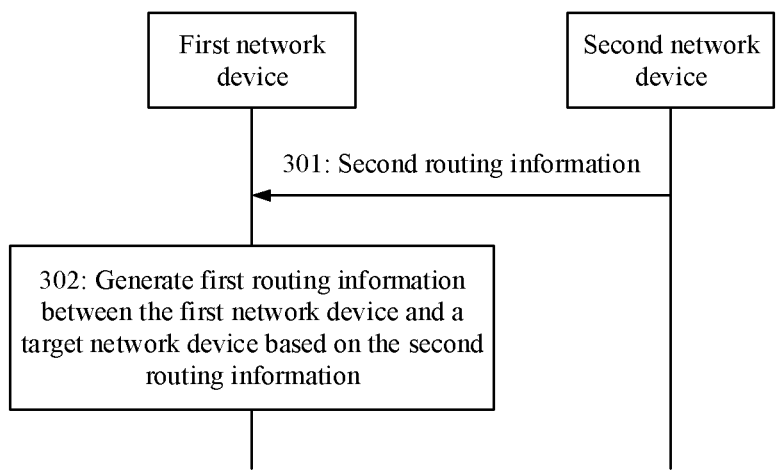
FIG. 3A is a schematic diagram of another embodiment of a route configuration method according to an embodiment of this disclosure.

FIG. 3A is a schematic diagram of another embodiment of a route configuration method according to an embodiment of this disclosure. FIG. 3A shows that a route configuration method according to an embodiment of this disclosure is applied to a scenario of routing in a BGP-based private network. In FIG. 3A, a second network device advertises an association relationship in a process of advertising second routing information. In the embodiment shown in FIG. 3A, the method includes the following steps.

301: A first network device receives the second routing information sent by the second network device.

The second routing information is used to indicate to send a packet to a target network device through a first path. The second routing information carries an association relationship. The association relationship includes an association relationship between the first path and a second path. The first path is a path that is from the first network device to the target network device and that is included in a first network slice, and the second path is a path that is from the first network device to the target network device and that is included in a second network slice.

For details of two possible association relationships that are between the first path and the second path and that are indicated by the association relationship, refer to related descriptions in step 201. Details are not described herein again.

Optionally, the association relationship includes an association relationship between a first identity and a second identity. The first identity is used to identify the target network device in the first network slice, and the first identity corresponds to the first path. The second identity is used to identify the target network device in the second network slice, and the second identity corresponds to the second path.

In this embodiment, the association relationship between the first path and the second path is reflected by using the association relationship between the first identity and the second identity. The first identity is a first VPNSid, and the second identity is a second VPNSid. The first VPNSid is a VPNSid of the first network slice corresponding to the target network device, and the first VPNSid corresponds to the first path of the first network slice. The second VPNSid is a VPNSid of the second network slice corresponding to the target network device, and the second VPNSid corresponds to the second path of the second network slice.

Optionally, an association relationship between the first VPNSid and the second VPNSid is carried in a Prefix-SID Attribute TLV field in the second routing information sent by the second network device, or in an SRv6 Services TLV field in the second routing information.

Figure 3B:
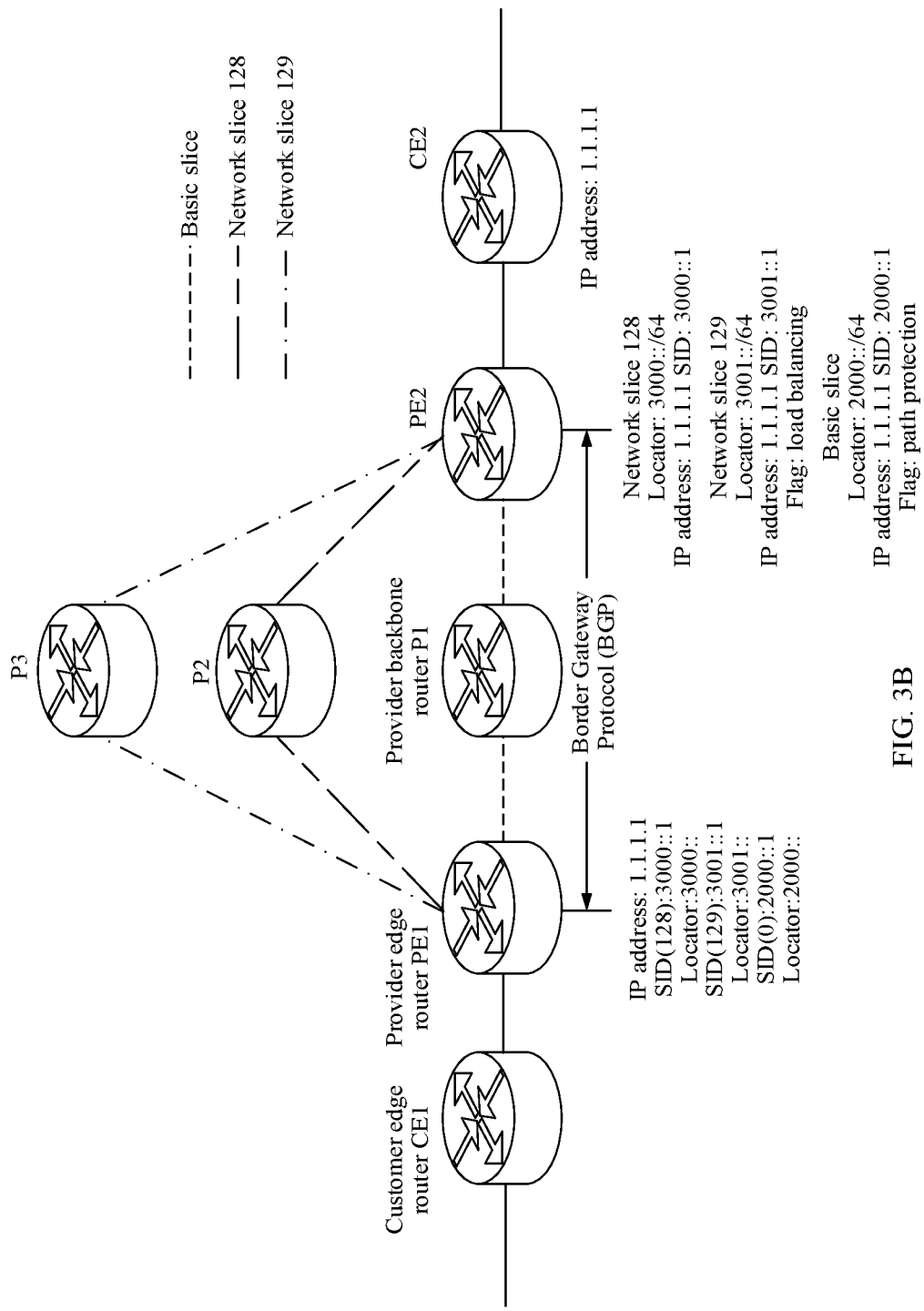
FIG. 3B is a schematic diagram of a network scenario of a route configuration method according to an embodiment of this disclosure.
Figure 3C:
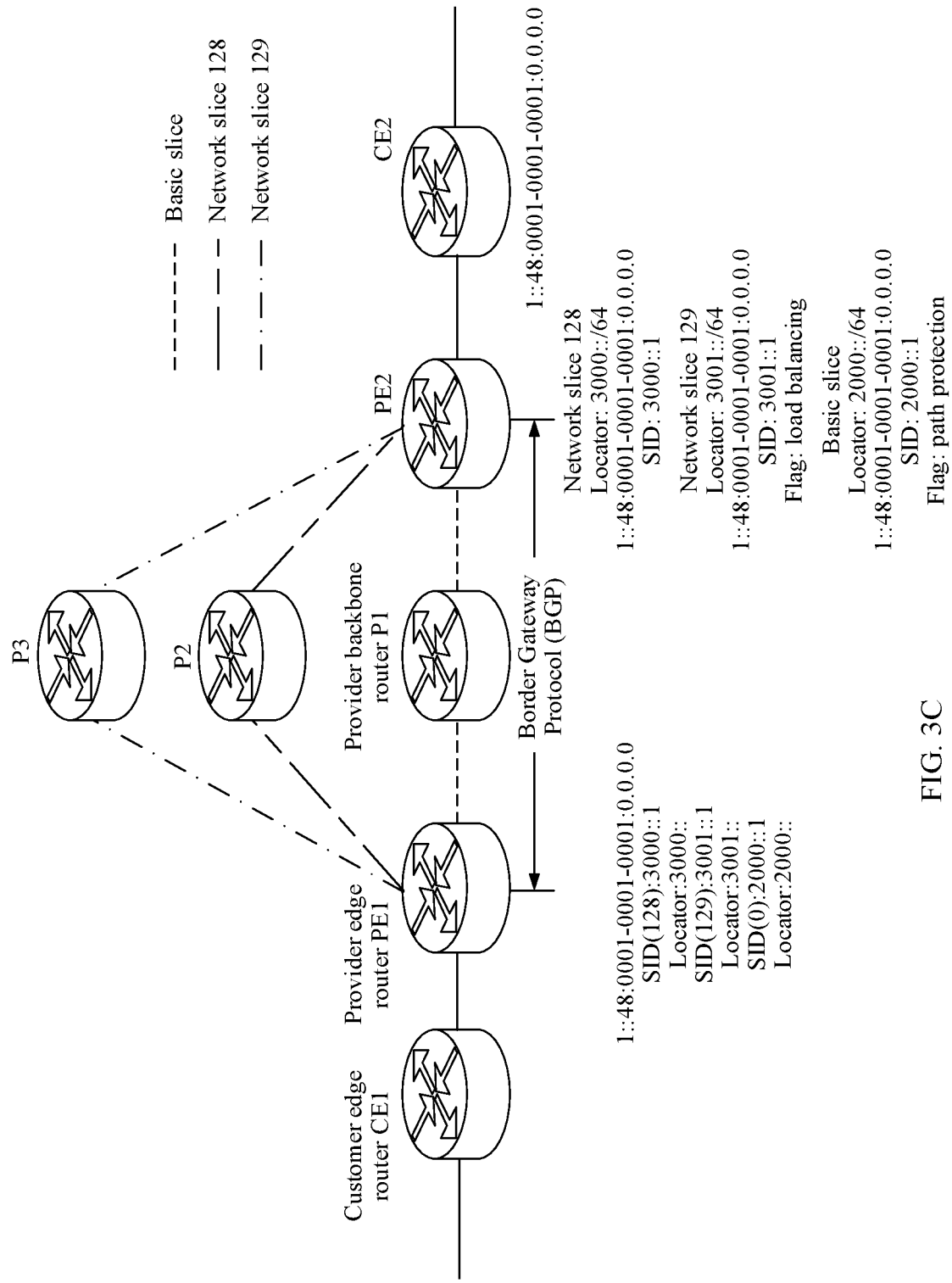
FIG. 3C is a schematic diagram of another network scenario of a route configuration method according to an embodiment of this disclosure.

The following describes the technical solutions in this embodiment of this disclosure with reference to FIG. 3B and FIG. 3C. It should be noted that in FIG. 3B and FIG. 3C, an example in which the second path is used to perform failure protection on the first path and a third path is used to perform load balancing on the first path is used to describe the association relationship. The third path is a path that is from the first network device to the target network device and that is included in a third network slice. A third VPNSid is a VPNSid of the third network slice corresponding to the target network device, and the third VPNSid corresponds to the third path that is from the PE1 to the CE2 and that is included in the third network slice. The association relationship includes the association relationship between the first VPNSid and the second VPNSid, and an association relationship between the first VPNSid and the third VPNSid.

This embodiment of this disclosure is applied to a scenario of the routing in the BGP-based private network, which may be a BGP-based L2VPN or L3VPN, or a BGP-based EVPN. This is not limited in this disclosure. The following separately provides descriptions with reference to FIG. 3B and FIG. 3C.

As shown in FIG. 3B, in the BGP-based L2VPN or L3VPN, the PE2 is configured to perform routing in the BGP-based L2VPN or L3VPN by using a basic slice, a network slice 128, and a network slice 129. A locator of the basic slice corresponding to the CE2 is 2000::/64, a locator of the network slice 128 corresponding to the CE2 is 3000::/64, and a locator of the network slice 129 corresponding to the CE2 is 3001::/64.

When the PE2 advertises second routing information for reaching the CE2, the PE2 generates the association relationship and carries the association relationship in the second routing information. The PE2 carries the association relationship in a TLV field in the second routing information. The PE2 generates an SRv6 Services TLV or a Prefix-SID Attribute TLV. Herein, the SRv6 Services TLV is used as an example.

The PE2 carries the association relationship in the SRv6 Services TLV field.

The SRv6 Services TLV separately carries an Internet Protocol (IP) address (1.1.1.1) of the CE2 and a first VPNSid 3000::1 of the network slice 128 corresponding to the CE2. The first VPNSid indicates a first path (PE1-P2-PE2) of the network slice 128.

A sub type-length-value (subTLV) of the SRv6 Services TLV carries the IP address (1.1.1.1) of the CE2, a second VPNSid 2000::1 of the basic slice corresponding to the CE2, and first indication information. The second VPNSid indicates a second path (PE1-P1-PE2) of the basic slice. The first indication information indicates that the second path is used to perform failure protection on the first path. For example, the first indication information is in a flag field of the subTLV.

Another subTLV of the SRv6 Services TLV carries the IP address (1.1.1.1) of the CE2, a third VPNSid 3001::1 of the network slice 129 corresponding to the CE3, and second indication information. The third VPNSid indicates a third path (PE1-P3-PE2) of the network slice 128. The second indication information indicates that the third path is used to perform load balancing on the first path. For example, the second indication information is in a flag field of the another subTLV.

Each VPNSid corresponds to a locator of a network slice. For example, the first VPNSid corresponds to the locator 3000::/64 of the network slice 128, the second VPNSid corresponds to the locator 2000::/64 of the basic slice, and the third VPNSid corresponds to the locator 3001::/64 of the network slice 129.

Then, the PE1 receives the SRv6 Services TLV advertised by the PE2, and determines, by using the SRv6 Services TLV, that the second path is used to perform failure protection on the first path, and the third path is used to perform load balancing on the first path. The first VPNSid is a VPNSid of the network slice 128 corresponding to the CE2, that is, SID (128) is 3000::1. The second VPNSid is a VPNSid of the basic slice corresponding to the CE2, that is, SID (0) is 2000::1. The third VPNSid is a VPNSid of the network slice 129 corresponding to the CE2, that is, SID (129) is 3001::1.

Advertisement of the association relationship in the BGP-based EVPN scenario in FIG. 3C is similar to advertisement of the association relationship in the BGP-based L2VPN or L3VPN scenario in FIG. 3B. A difference lies in that in FIG. 3B, when the PE2 advertises the second routing information of the CE2, the IP address of the CE2 is carried, for example, the IP address of the CE2 is 1.1.1.1, but in FIG. 3C, when the PE2 advertises the second routing information of the CE2, an EVPN address of the CE2 is carried, for example, the EVPN address of the CE2 is 1::48:0001-0001-0001: 0.0.0.0.

It should be noted that, in this embodiment, the second routing information may be private network routing information for reaching the target network device sent by the second network device to the first network device.

302: The first network device generates first routing information between the first network device and the target network device based on the second routing information.

The first routing information is similar to the first routing information in the embodiment shown in FIG. 2. For details, refer to the foregoing related descriptions. Details are not described herein again.

In a possible implementation, in the BGP-based L2VPN or L3VPN scenario shown in FIG. 3B, when the PE1 receives the second routing information for reaching the CE2 sent by the PE2, the PE1 generates, by iterating a VPNSid, the first routing information for reaching 1.1.1.1.

As shown in FIG. 3B, the PE1 determines that first routing information for reaching the CE2 (whose IP address is 1.1.1.1) is SID (128): 3000:1, and a locator corresponding to the PE2 is 3000::, a locator corresponding to the PE2 is 3001:: in SID (129): 3001::1, and a locator corresponding to the PE2 is 2000:: in SID (0): 2000::1. In this case, the PE1 may send a packet to the CE2 through the first path corresponding to SID (128). When the first path is unavailable, the PE1 sends a packet to the CE2 through the second path corresponding to SID (0). When load of the first path is greater than a first preset threshold, or when the PE1 receives a plurality of to-be-transmitted data streams whose destination addresses are the CE2, the PE1 sends a packet to the CE2 through the third path corresponding to SID (129).

In another possible implementation, in the BGP-based EVPN scenario shown in FIG. 3C, when the PE1 receives the second routing information for reaching the CE2 sent by the PE2, the PE1 generates, by iterating a VPNSid, the first routing information for reaching 1::48:0001-0001-0001: 0.0.0.0. As shown in FIG. 3C, the PE1 determines that first routing information for reaching the CE2 (whose EVPN address is 1::48:0001-0001-0001:0.0.0.0) is SID (128): 3000:1, and a locator corresponding to the PE2 is 3000::, a locator corresponding to the PE2 is 3001:: in SID (129): 3001::1, and a locator corresponding to the PE2 is 2000:: in SID (0): 2000::1. In this case, the PE1 may send a packet to the CE2 through the first path corresponding to SID (128). When the first path is unavailable, the PE1 sends a packet to the CE2 through the second path corresponding to SID (0). When load of the first path is greater than a first preset threshold, or when the PE1 receives a plurality of to-be-transmitted data streams whose destination addresses are the CE2, the PE1 sends a packet to the CE2 through the third path corresponding to SID (129).

In this embodiment of this disclosure, in the scenario of the routing in the BGP-based private network, the first network device receives the second routing information sent by the second network device, where the second routing information carries the association relationship between the first VPNSid and the second VPNSid. Then, the first network device generates the first routing information between the first network device and the target network device based on the association relationship between the first VPNSid and the second VPNSid, so that the first network device sends a packet to the target network device through the first path, and when the cross-slice condition is met, the first network device sends a packet to the target network device through the second path, to improve network transmission performance. For example, when the first path is unavailable, the first network device may send a packet to the target network device through the second path, so that the packet can be successfully forwarded to the target network device, to improve a packet transmission success rate and network transmission performance. According to the method, cross-slice forwarding in a specific condition can be implemented, and resources in a plurality of slices can be fully utilized under a condition of retaining a slice concept, to improve network performance.

Figure 4A:
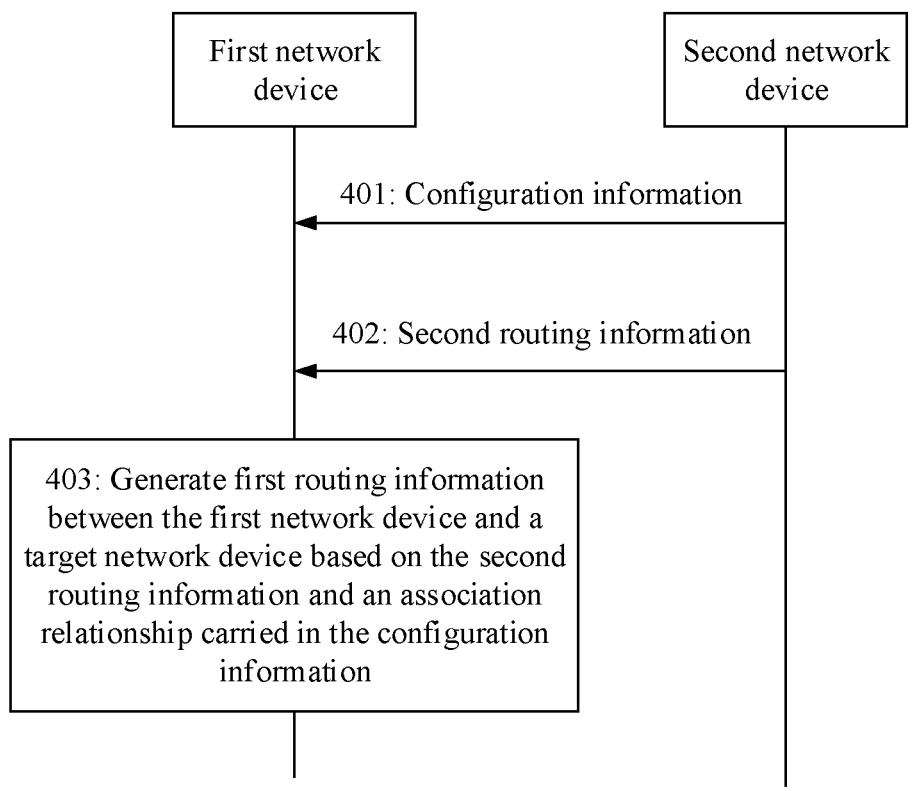
FIG. 4A is a schematic diagram of another embodiment of a route configuration method according to an embodiment of this disclosure.

FIG. 4A is a schematic diagram of another embodiment of a route configuration method according to an embodiment of this disclosure. FIG. 4A shows that a route configuration method according to an embodiment of this disclosure is applied to routing in an IGP-based network, for example, routing in an IGP-based public network or routing in an IGP-based private network. For example, in an IGP-based SR network, a second network device advertises an association relationship when advertising a prefix SID of a network slice corresponding to a target network device. In an IGP-based SRv6 network, the second network device advertises the association relationship when advertising a locator of a network slice corresponding to the target network device. The method includes the following steps.

401: A first network device receives configuration information that is for a first path and that is sent by the second network device.

The configuration information for the first path carries an association relationship between the first path and a second path. The first path is a path that is from the first network device to the target network device and that is included in a first network slice, and the second path is a path that is from the first network device to the target network device and that is included in a second network slice.

For details of two possible association relationships that are between the first path and the second path and that are indicated by the association relationship, refer to related descriptions in step 201. Details are not described herein again.

Optionally, the association relationship includes an association relationship between a first identity and a second identity. The first identity is used to identify the target network device in the first network slice, and the first identity corresponds to the first path. The second identity is used to identify the target network device in the second network slice, and the second identity corresponds to the second path.

In this embodiment, the association relationship between the first path and the second path is reflected by using the association relationship between the first identity and the second identity.

In a possible implementation, in the IGP-based SR network, the first identity is a first prefix SID, and the second identity is a second prefix SID. The first prefix SID is a prefix SID of the first network slice corresponding to the target network device, and the first prefix SID corresponds to the first path of the first network slice. The second prefix SID is a prefix SID of the second network slice corresponding to the target network device, and the second prefix SID corresponds to the second path of the second network slice. In this case, in this manner, an association relationship between the first prefix SID and the second prefix SID is carried in a Prefix-SID TLV field in the configuration information.

In another possible implementation, in the IGP-based SRv6 network, the first identity is a first locator, and the second identity is a second locator. The first locator is a locator of the first network slice corresponding to the target network device, and the first locator corresponds to the first path of the first network slice. The second locator is a locator of the second network slice corresponding to the target network device, and the second locator corresponds to the second path of the second network slice. In this case, in this manner, an association relationship between the first locator and the second locator is carried in a locator TLV field in the configuration information.

The following uses the IGP-based SRv6 network as an example to describe the association relationship. It should be noted that in FIG. 4B, an example in which the second path is used to perform failure protection on the first path and a third path is used to perform load balancing on the first path is used to describe the association relationship. The target network device corresponds to a third locator of a third network slice, and the third locator corresponds to the third path that is from the first network device to the target network device and that is included in the third network slice. The association relationship includes the association relationship between the first locator and the second locator and/or an association relationship between the first locator and the third locator.

Figure 4B:
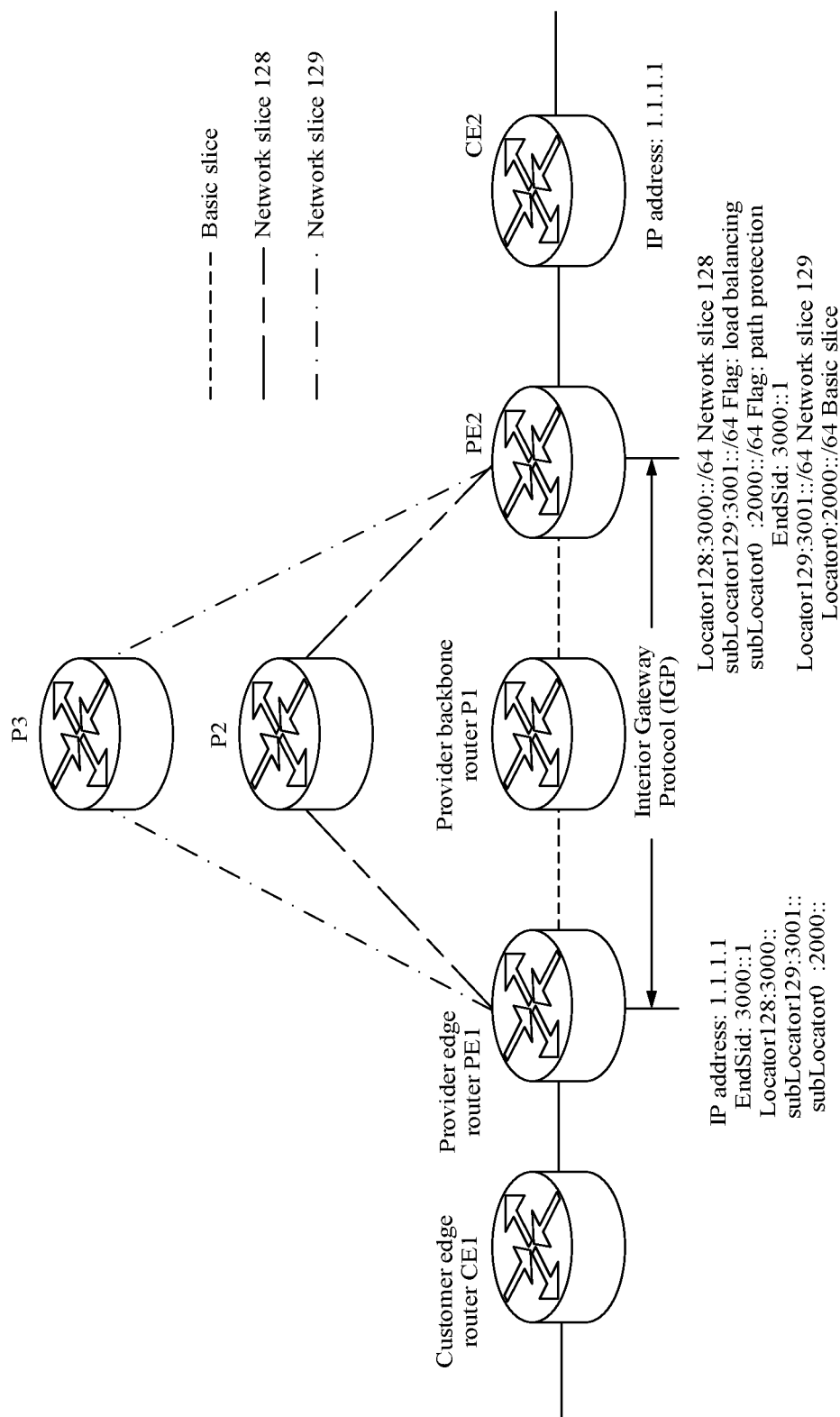
FIG. 4B is a schematic diagram of another network scenario of a route configuration method according to an embodiment of this disclosure.

As shown in FIG. 4B, the PE2 may perform routing in the IGP-based SRv6 network by using a basic slice, a network slice 128, and a network slice 129. The PE2 generates the association relationship, and advertises the association relationship when advertising a locator of the network slice 128 corresponding to the PE2. The PE2 advertises the association relationship by using a locator TLV field in the configuration information.

As shown in FIG. 4B, when advertising locator128 of the network slice 128 corresponding to the CE2, the PE2 generates a corresponding locator TLV. locator128 indicates a first path (PE1-P2-PE2) that is from the PE1 to the CE2 and that is included in the network slice 128. In this case, two subTLVs are defined under the locator TLV. A first subTLV carries locator0 of the basic slice corresponding to the CE2 and first indication information. locator0 indicates a second path (PE1-P1-PE2) that is from the PE1 to the CE2 and that is included in the basic slice. The first indication information indicates that the second path is used to perform failure protection on the first path. For example, the first indication information is in a flag field of the first subTLV.

A second subTLV carries locator129 of the network slice 129 corresponding to the CE2 and second indication information. locator129 indicates a third path (PE1-P3-PE2) that is from the PE1 to the CE2 and that is included in the network slice 129. The second indication information indicates that the third path is used to perform load balancing on the first path. For example, the second indication information is in a flag field of the second subTLV. locator0 of the basic slice corresponding to the CE2 is 2000::/64, locator128 of the network slice 128 corresponding to the CE2 is 3000::/64, and locator129 of the network slice 129 corresponding to the CE2 is 3001::/64. locator129 of the network slice 129 and locator0 of the basic slice are advertised according to an existing procedure. Details are not described herein again.

In this embodiment of this disclosure, the second network device may advertise a sublocator by using a subTLV (for example, the subTLV of the locator TLV) in an existing procedure, or may advertise the sublocator by defining a new TLV. This is not limited in this disclosure.

402: The first network device receives second routing information sent by the second network device.

The second routing information indicates to send a packet to the target network device through the first path. For example, as shown in FIG. 4B, in the IGP-based SRv6 network, an IP address of the CE2 is 1.1.1.1, and the PE2 advertises second routing information for reaching 1.1.1.1. The second routing information indicates to send a packet to the CE2 through the first path that is from the PE1 to the CE2 and that is included in the network slice 128. The PE2 advertises the IP address (1.1.1.1) corresponding to the CE2 and EndSid 3000::1 of the network slice 128 corresponding to the CE2. To be specific, the second routing information carries the IP address (1.1.1.1) corresponding to the CE2 and EndSid 3000::1 of the network slice 128 corresponding to the CE2.

403: The first network device generates first routing information between the first network device and the target network device based on the second routing information and the association relationship carried in the configuration information.

The first routing information is similar to the first routing information in step 202 in the embodiment shown in FIG. 2. For details, refer to the foregoing related descriptions in step 202 in the embodiment shown in FIG. 2. Details are not described herein again.

For example, in the IGP-based SRv6 network shown in FIG. 4B, the PE1 receives the second routing information for reaching the CE2 sent by the PE2. The second routing information carries the IP address (1.1.1.1) corresponding to the CE2 and EndSid 3000::1 of the network slice 128 corresponding to the CE2. The PE1 determines, based on EndSid 3000::1 of the network slice 128 corresponding to the CE2, locator128 of the network slice 128 corresponding to the CE2, and determines, based on the association relationship, that locator128 is associated with locator129 and locator0. Then, the PE1 generates, based on the association relationship and the second routing information, the first routing information for reaching 1.1.1.1.

After the PE1 receives the association relationship and the second routing information, the PE1 determines, through route learning, that locator128 of the network slice 128 corresponding to the PE2 is 3000::, locator129 of the network slice 129 corresponding to the PE2 is 3001::, and locator0 of the basic slice corresponding to the PE2 is 2000::. In this case, the PE1 generates, based on the association relationship between locator128 of the network slice 128 corresponding to the CE2 and locator0 of the basic slice corresponding to the CE2, and the association relationship between locator128 of the network slice 128 corresponding to the CE2 and locator129 of the network slice 129 corresponding to the CE2, the first routing information for reaching 1.1.1.1 as shown in FIG. 4B. For routing information for reaching the IP address (1.1.1.1): EndSid is 3000::1, and the locator128 is 3000::. locator128 has two sublocators: sublocator129 30001:: and sublocator0 2000::, where sublocator0 is configured to perform failure protection on the first path that is from the PE1 to the CE2 and that is included in the network slice 128, sublocator129 is configured to perform load balancing on the first path included in the network slice 128, sublocator0 corresponds to the second path, and sublocator129 corresponds to the third path.

In this case, the PE1 sends a packet to the CE2 through the first path. When the first path is unavailable, the PE1 sends a packet to the CE2 through the second path that is from the PE1 to the CE2 and that is included in the basic slice. When load of the first path is greater than a first preset threshold, or when the PE1 receives a plurality of to-be-transmitted data streams whose destination addresses are the CE2, the PE1 sends a packet to the CE2 through the third path that is from the PE1 to the CE2 and that is included in the network slice 129.

In this embodiment of this disclosure, in a scenario of routing in the IGP-based network, IGP-based SRv6 network routing is used as an example. The first network device advertises the association relationship when advertising the first locator of the first network slice corresponding to the target network device. The association relationship includes the association relationship between the first locator and the second locator. The first locator is the locator of the first network slice corresponding to the target network device, and the first locator corresponds to the first path of the first network slice. The second locator is the locator of the second network slice corresponding to the target network device, and the second locator corresponds to the second locator of the second network slice. The association relationship between the first locator and the second locator is used to indicate the association relationship between the first path and the second path. Then, the first network device receives the second routing information sent by the second network device. The second routing information indicates to send a packet to the target network device through the first path. The first network device generates the first routing information between the first network device and the target network device based on the association relationship and the second routing information, so that the first network device sends a packet to the target network device through the first path. In addition, when the cross-slice condition is met, the first network device sends a packet to the target network device through the second path that is from the first network device to the target network device and that is included in the second network slice, to improve a packet transmission success rate and network transmission performance. For example, when the first path is unavailable, the first network device may send a packet to the target network device through the second path, so that the packet can be successfully forwarded to the target network device, to improve a packet transmission success rate and network transmission performance. According to the method, cross-slice forwarding in a specific condition can be implemented, and resources in a plurality of slices can be fully utilized under a condition of retaining a slice concept, to improve network performance.

Figure 5:
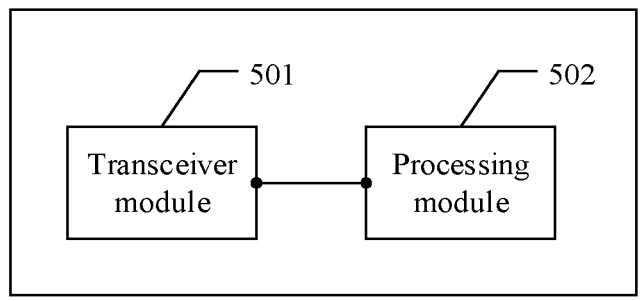
FIG. 5 is a schematic diagram of a structure of a route configuration apparatus according to an embodiment of this disclosure.

The foregoing describes the route configuration methods in embodiments of this disclosure, and the following describes route configuration apparatuses provided in embodiments of this disclosure. FIG. 5 is a schematic diagram of a structure of a route configuration apparatus according to an embodiment of this disclosure. The first network device may be understood as the route configuration apparatus shown in FIG. 5. The route configuration apparatus may implement functions of the first network device in the embodiments shown in FIG. 2, FIG. 3A, and FIG. 4A. The route configuration apparatus includes a transceiver module 501 and a processing module 502. These modules may perform corresponding functions of the first network device in the foregoing method embodiments. The transceiver module 501 is configured to support the route configuration apparatus in performing step 201 in the embodiment shown in FIG. 2, step 301 in the embodiment shown in FIG. 3A, and step 401 and step 402 in the embodiment shown in FIG. 4A. The processing module 502 is configured to support the route configuration apparatus in performing step 202 in the embodiment shown in FIG. 2, step 302 in the embodiment shown in FIG. 3A, and step 403 in the embodiment shown in FIG. 4A, and/or another process performed by the first network device in the technology described in this specification. For example, the transceiver module 501 is configured to perform the step in which the first network device receives an association relationship sent by the second network device in the foregoing method embodiment, where the association relationship includes an association relationship between the first path and the second path. The processing module 502 is configured to generate first routing information between the route configuration apparatus and the target network device based on the association relationship, where the first routing information is used by the route configuration apparatus to send a packet to the target network device by using the first path, and when a cross-slice condition is met, the route configuration apparatus sends a packet to the target network device by using the second path. For details, refer to the detailed descriptions in the foregoing embodiments. Details are not described herein again.

Figure 6:
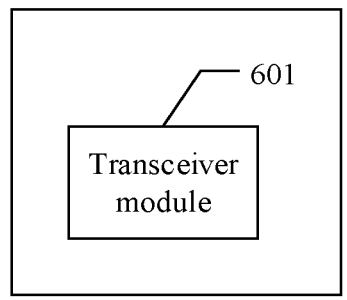
FIG. 6 is a schematic diagram of another structure of a route configuration apparatus according to an embodiment of this disclosure.

The following describes another route configuration apparatus provided in an embodiment of this disclosure. FIG. 6 is a schematic diagram of another structure of a route configuration apparatus according to an embodiment of this disclosure. The second network device may be understood as the route configuration apparatus shown in FIG. 6. The route configuration apparatus may implement functions of the second network device in the embodiments shown in FIG. 2, FIG. 3A, and FIG. 4A. The route configuration apparatus includes a transceiver module 601. The module may perform corresponding functions of the second network device in the foregoing method embodiments. The transceiver module 601 is configured to support the route configuration apparatus in performing step 201 in the embodiment shown in FIG. 2, step 301 in the embodiment shown in FIG. 3A, and step 401 and step 402 in the embodiment shown in FIG. 4A, and/or another process performed by the second network device in the technology described in this specification. For example, the transceiver module 601 is configured to perform the step in which the second network device sends an association relationship to the first network device in the foregoing method embodiment. For details, refer to the detailed descriptions in the foregoing embodiments. Details are not described herein again.

Figure 7:
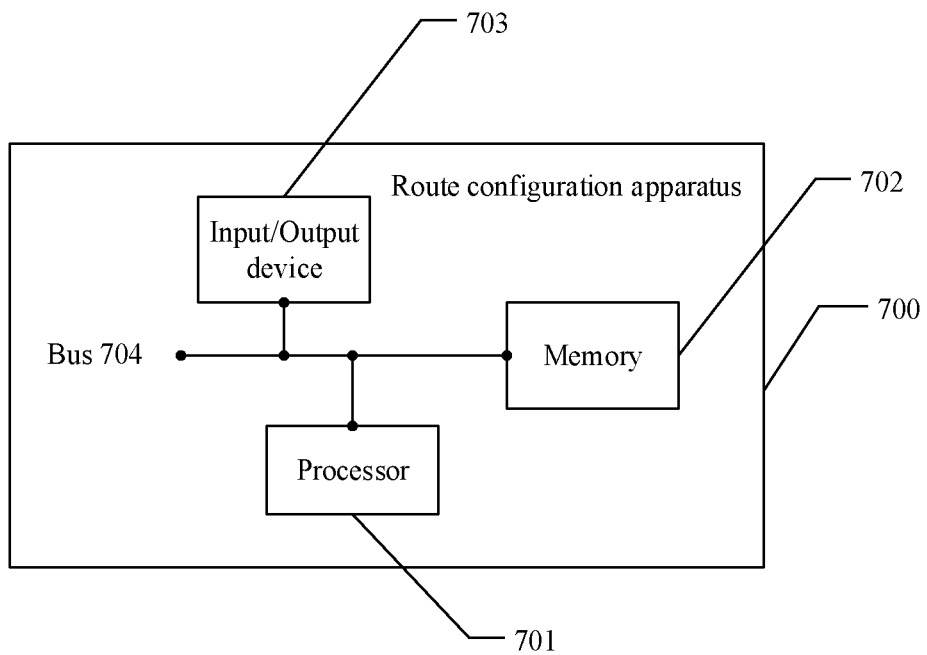
FIG. 7 is a schematic diagram of a structure of a route configuration apparatus according to an embodiment of this disclosure.

FIG. 7 is a schematic diagram of another structure of a route configuration apparatus according to an embodiment of this disclosure. The first network device may be understood as the route configuration apparatus 700 shown in FIG. 7. The route configuration apparatus 700 includes a processor 701, a memory 702, an input/output device 703, and a bus 704. The processor 701, the input/output device 703, and the memory 702 are connected to each other by using the bus 704. The bus 704 may be a PCI bus, an EISA bus, or the like. The bus may be classified into an address bus, a data bus, a control bus, and the like. For ease of representation, only one bold line is used to represent the bus in FIG. 7, but this does not mean that there is only one bus or only one type of bus. The route configuration apparatus 700 may implement functions of the first network device in the embodiments shown in FIG. 2, FIG. 3A, and FIG. 4A. The input/output device 703 is configured to support step 201 in the embodiment shown in FIG. 2, step 301 in the embodiment shown in FIG. 3A, and step 401 and step 402 in the embodiment shown in FIG. 4A. The processor 701 is configured to support step 202 in the embodiment shown in FIG. 2, step 302 in the embodiment shown in FIG. 3A, and step 403 in the embodiment shown in FIG. 4A. The memory 702 is configured to store program code and data. When the embodiment shown in FIG. 5 is implemented, and the units described in the embodiment in FIG. 5 are implemented by using software, software or program code required for performing a function of the processing module 502 in FIG. 5 is stored in the memory 701. For a specific execution process, refer to the foregoing detailed descriptions in corresponding steps in the embodiments shown in FIG. 2, FIG. 3A, and FIG. 4A. Details are not described herein again.

Figure 8:
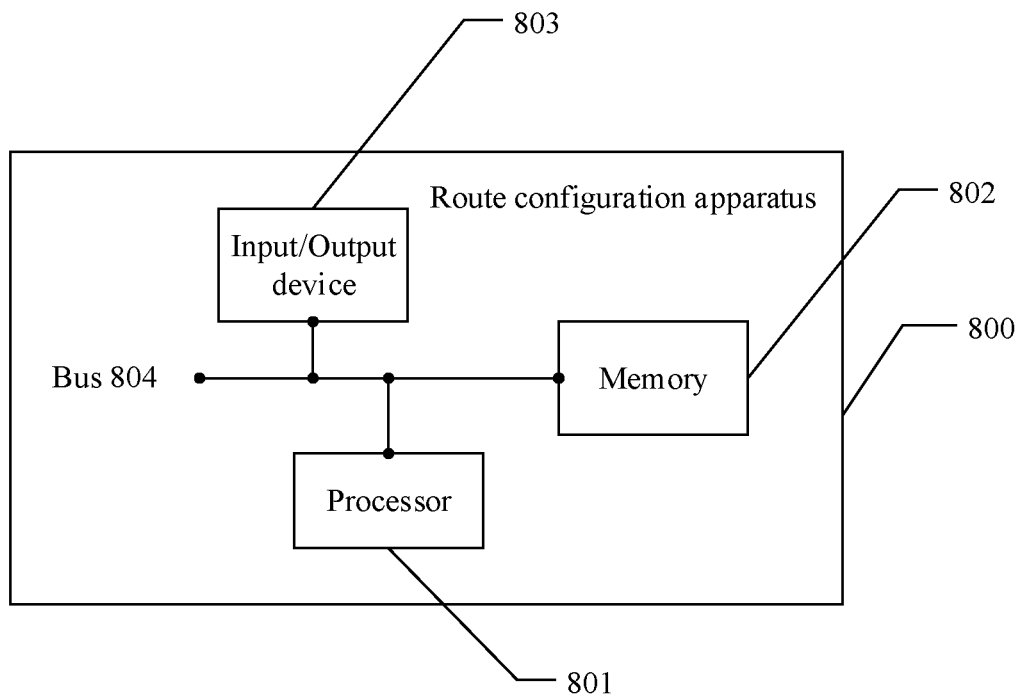
FIG. 8 is a schematic diagram of another structure of a route configuration apparatus according to an embodiment of this disclosure.

FIG. 8 is a schematic diagram of another structure of a route configuration apparatus according to an embodiment of this disclosure. The first network device may be understood as the route configuration apparatus 800 shown in FIG. 8. The route configuration apparatus 800 includes a processor 801, a memory 802, an input/output device 803, and a bus 804. The processor 801, the input/output device 803, and the memory 802 are connected to each other by using the bus 804. The bus 804 may be a PCI bus, an EISA bus, or the like. The bus may be classified into an address bus, a data bus, a control bus, and the like. For ease of representation, only one bold line is used to represent the bus in FIG. 8, but this does not mean that there is only one bus or only one type of bus. The route configuration apparatus 800 may implement functions of the second network device in the embodiments shown in FIG. 2, FIG. 3A, and FIG. 4A. The input/output device 803 is configured to support step 201 in the embodiment shown in FIG. 2, step 301 in the embodiment shown in FIG. 3A, and step 401 and step 402 in the embodiment shown in FIG. 4A. The memory 802 is configured to store program code and data. For a specific execution process, refer to the foregoing detailed descriptions in corresponding steps in the embodiments shown in FIG. 2, FIG. 3A, and FIG. 4A. Details are not described herein again.

Figure 9:
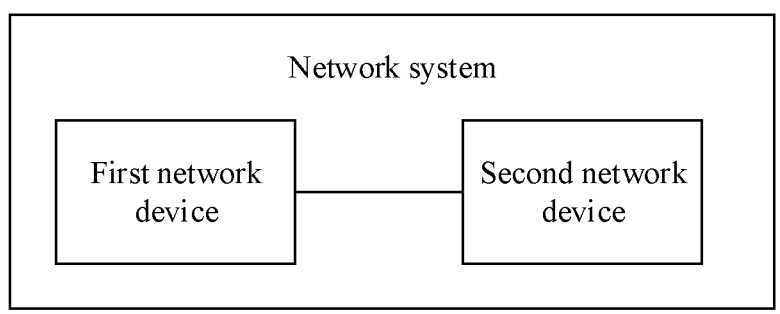
FIG. 9 is a schematic diagram of a structure of a network system according to an embodiment of this disclosure.

An embodiment of this disclosure further provides a network system. The network system includes a route configuration apparatus. Optionally, the network system includes the route configuration apparatus shown in FIG. 5 and the route configuration apparatus shown in FIG. 6, or the network system includes the route configuration apparatus shown in FIG. 7 and the route configuration apparatus shown in FIG. 8. FIG. 9 is a schematic diagram of a structure of a network system according to an embodiment of this disclosure. The network system includes a first network device and a second network device. The first network device may be the route configuration apparatus shown in FIG. 5, and the second network device may be the route configuration apparatus shown in FIG. 6. Alternatively, the first network device may be the route configuration apparatus shown in FIG. 7, and the second network device may be the route configuration apparatus shown in FIG. 8. The first network device may be configured to perform all or some of the steps performed by the first network device in the embodiments shown in FIG. 2, FIG. 3A, and FIG. 4A, and the second network device may be configured to perform all or some of the steps performed by the second network device in the embodiments shown in FIG. 2, FIG. 3A, and FIG. 4A.

An embodiment of this disclosure further provides a computer program product including instructions. When the computer program product runs on a computer, the computer performs the route configuration method in the embodiments shown in FIG. 2, FIG. 3A, and FIG. 4A.

An embodiment of this disclosure further provides a computer-readable storage medium including instructions. When the instructions are run on a computer, the computer is enabled to perform the route configuration method in the embodiments shown in FIG. 2, FIG. 3A, and FIG. 4A.

It may be clearly understood by persons skilled in the art that, for convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatuses, and methods may be implemented in other manners. For example, the foregoing apparatus embodiments are merely examples. For example, division of the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected according to actual requirements to achieve the objectives of the solutions of embodiments.

In addition, function units in embodiments of this disclosure may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of this disclosure essentially, or the part contributing to other technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this disclosure. The storage medium includes any medium that can store program code, such as a Universal Serial Bus (USB) flash drive, a removable hard disk, a read-only memory (ROM), a random-access memory (RAM), a magnetic disk, or an optical disc.

In this disclosure, the terms "first", "second", and the like are used to distinguish between same or similar items whose effects and functions are basically the same. It should be understood that there is no logical or time-sequence dependency between "first", "second", and "$n^{th}$", and a quantity and an execution sequence are not limited. It should be further understood that although the terms such as "first" and "second" are used in the following descriptions to describe various elements, these elements should not be limited by the terms. These terms are merely used to distinguish one element from another element. For example, without departing from the scope of the various examples, a first image may be referred to as a second image, and similarly, a second image may be referred to as a first image. Both the first image and the second image may be images, and in some cases, may be separate and different images.

The term "at least one" in this disclosure means one or more, and the term "a plurality of" in this disclosure means two or more than two. For example, "a plurality of second packets" means two or more than two second packets. The terms "system" and "network" may be used interchangeably in this specification.

It should be understood that the terms used in the descriptions of various examples in this specification are merely intended to describe specific examples but are not intended to constitute a limitation. The terms "one" ("a" and "an") and "the" of singular forms used in the descriptions of the various examples and the appended claims are also intended to include plural forms, unless otherwise specified in the context clearly.

It should further be understood that, the term "and/or" used in this specification indicates and includes any or all possible combinations of one or more items in associated listed items. The term "and/or" describes an association relationship between associated objects and represents that three relationships may exist. For example, A and/or B may represent the following three cases: only A exists, both A and B exist, and only B exists. In addition, the character "/" in this disclosure usually indicates an "or" relationship between associated objects.

It should be further understood that sequence numbers of processes do not mean execution sequences in embodiments of this disclosure. The execution sequences of the processes should be determined based on functions and internal logic of the processes, and should not be construed as any limitation on the implementation processes of embodiments of this disclosure.

It should be understood that determining B based on A does not mean that B is determined based on only A, but B may alternatively be determined based on A and/or other information.

It should be further understood that the term "include" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or their combinations not excluded.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

It should be understood that "one embodiment", "an embodiment", and "a possible implementation" mentioned in the entire specification mean that particular features, structures, or characteristics related to the embodiment or the implementation are included in at least one embodiment of this disclosure. Therefore, "in one embodiment", "in an embodiment", or "in a possible implementation" appearing throughout this specification does not necessarily mean a same embodiment. In addition, these particular features, structures, or characteristics may be combined in one or more embodiments in any proper manner.

In conclusion, the foregoing embodiments are merely intended for describing the technical solutions of this disclosure, but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this disclosure.

What is claimed is:

1. A method, comprising:
   receiving a first association relationship between a first path from a first network device to a target network device and a second path from the first network device to the target network device, wherein the first association relationship comprises a first identifier of the first path from the first network device to the target network device and a second identifier of the second path from the first network device to the target network device, wherein the first path is used to transmit packets to the target network device in a first network slice, and wherein the second path is used to transmit packets to the target network device in a second network slice;

sending, in response to a cross-slice condition not being met, a packet to the target network device through the first path, wherein the cross-slice condition comprises that the first path is unavailable, that a load of the first path is greater than a first preset threshold, or that the first network device receives at least two to-be-transmitted data streams, and wherein the at least two to-be-transmitted data streams have a same destination address of the target network device;

sending, in response to the first path being unavailable, the packet to the target network device through the second path;

sending, in response to the load of the first path being greater than the first preset threshold, the packet to the target network device through the second path; and sending, in response to the first network device receiving the at least two to-be-transmitted data streams having the same destination address of the target network device, a first packet from one of the at least two to-be-transmitted data streams to the target network device through the first path and a second packet from a second one of the at least two to-be-transmitted data streams to the target network device through the second path.

2. The method of claim 1, wherein the first association relationship indicates that the second path performs failure protection on the first path.

3. The method of claim 1, wherein the first association relationship indicates that the second path performs load balancing on the first path.

4. The method of claim 1, wherein receiving the first association relationship comprises receiving routing information from a second network device, and wherein the routing information carries the first association relationship.

5. The method of claim 1, wherein the first identifier identifies the target network device in the first network slice, wherein the first network slice comprises the first path, the second identifier identifies the target network device in the second network slice, and wherein the second network slice comprises the second path.

6. The method of claim 5, wherein the first identifier is a first virtual private network segment identity (VPNSid), wherein the second identifier is a second VPNSid, and wherein a second association relationship between the first VPNSid and the second VPNSid is comprised in a prefix segment identity attribute type length value (Prefix-SID Attribute TLV) field or in a Segment Routing over Internet Protocol version 6 Services type-length-value (SRv6 Services TLV) field.

7. The method of claim 5, wherein the first identifier is a first locator, the second identifier is a second locator, and a second association relationship between the first locator and the second locator is comprised in a locator type-length-value (Locator TLV) field, or wherein the first identifier is a first prefix segment identity (SID), the second identifier is a second prefix SID, and a third association relationship between the first prefix SID and the second prefix SID is comprised in a prefix segment identity type-length-value (Prefix-SID TLV) field.

8. A method, comprising:
generating a first association relationship between a first path from a first network device to a target network device and a second path from the first network device to the target network device, wherein the first association relationship comprises a first identifier of the first path from the first network device to the target network device and a second identifier of the second path from the first network device to the target network device,
wherein the first path is used to transmit packets to the target network device in a first network slice, wherein the second path is used to transmit packets to the target network device in a second network slice,
wherein the first association relationship instructs the first network device to send, in response to a cross-slice condition not being met, a packet to the target network device through the first path,
send, in response to the first path being unavailable, the packet to the target network device through the second path,
send, in response to a load of the first path being greater than a first preset threshold, the packet to the target network device through the second path, and
send, in response to the first network device receiving at least two to-be-transmitted data streams having a same destination address of the target network device, a first packet from one of the at least two to-be-transmitted data streams to the target network device through the first path and a second packet from a second one of the at least two to-be-transmitted data streams to the target network device through the second path, and
wherein the cross-slice condition comprises that the first path is unavailable, that the load of the first path is greater than the first preset threshold, or that the first network device receives the at least two to-be-transmitted data streams having the same destination address of the target network device; and
sending, to the first network device, the first association relationship.

9. The method of claim 8, wherein the first association relationship indicates that the second path performs failure protection on the first path.

10. The method of claim 8, wherein the first association relationship indicates that the second path performs load balancing on the first path.

11. The method of claim 8, wherein sending the first association relationship comprises sending routing information to the first network device, and wherein the routing information carries the first association relationship.

12. The method of claim 8, wherein sending the first association relationship comprises sending configuration information to the first network device, and wherein the configuration information carries the first association relationship.

13. The method of claim 12, wherein the first identifier identifies the target network device in the first network slice, wherein the first network slice comprises the first path, wherein the second identifier identifies the target network device in the second network slice, and wherein the second network slice comprises the second path.

14. The method of claim 13, wherein the first identifier is a first virtual private network segment identity (VPNSid), wherein the second identifier is a second VPNSid, and wherein a second association relationship between the first VPNSid and the second VPNSid is comprised in a prefix segment identity attribute type length value (Prefix-SID Attribute TLV) field or in a Segment Routing over Internet Protocol version 6 Services type length value (SRv6 Services TLV) field.

15. The method of claim 13, wherein the first identifier is a first locator, the second identifier is a second locator, and a second association relationship between the first locator and the second locator is comprised in a locator type length value (Locator TLV) field, or wherein the first identifier is a first prefix segment identity (SID), the second identifier is a second prefix SID, and a third association relationship between the first prefix SID and the second prefix SID is comprised in a prefix segment identity type length value (Prefix-SID TLV) field.

16. An apparatus, comprising:
a memory configured to store instructions; and
one or more processors coupled to the memory and configured to execute the instructions to:
receive a first association relationship between a first path from a first network device to a target network device and a second path from the first network device to the target network device, wherein the first association relationship comprises a first identifier of the first path from the first network device to the target network device and a second identifier of the second path from the first network device to the target network device, wherein the first path is used to transmit packets to the target network device in a first network slice, and wherein the second path is used to transmit packets to the target network device in a second network slice;
send, in response to a cross-slice condition not being met, a packet to the target network device through the first path, wherein the cross-slice condition comprises that the first path is unavailable, that a load of the first path is greater than a first preset threshold, or that the first network device receives at least two to-be-transmitted data streams, and wherein the at least two to-be-transmitted data streams have a same destination address of the target network device;
send, in response to the first path being unavailable, the packet to the target network device through the second path;
send, in response to the load of the first path being greater than the first preset threshold, the packet to the target network device through the second path; and
send, in response to the first network device receiving the at least two to-be-transmitted data streams having the same destination address of the target network device, a first packet from one of the at least two to-be-transmitted data streams to the target network device through the first path and a second packet from a second one of the at least two to-be-transmitted data streams to the target network device through the second path.

17. The apparatus of claim 16, wherein the first association relationship indicates that the second path performs failure protection on the first path.

18. The apparatus of claim 16, wherein the first association relationship indicates that the second path performs load balancing on the first path.

19. The method of claim 1, wherein the first identifier identifies the target network device in the first network slice, wherein the first network slice comprises the first path, the second identifier identifies the target network device in the second network slice, wherein the second network slice comprises the second path, wherein the first identifier is a first virtual private network segment identity (VPNSid), wherein the second identifier is a second VPNSid, and wherein the first association relationship is between the first VPNSid and the second VPNSid and is comprised in a prefix segment identity attribute type length value (Prefix-SID Attribute TLV) field or in a Segment Routing over Internet Protocol version 6 Services type-length-value (SRv6 Services TLV) field.

20. The method of claim 1, wherein the first identifier identifies the target network device in the first network slice, wherein the first network slice comprises the first path, the second identifier identifies the target network device in the second network slice, wherein the second network slice comprises the second path, wherein the first identifier is a first locator, the second identifier is a second locator, and the first association relationship is between the first locator and the second locator and is comprised in a locator type-length-value (Locator TLV) field, or wherein the first identifier is a first prefix segment identity (SID), the second identifier is a second prefix SID, and the first association relationship is between the first prefix SID and the second prefix SID and is comprised in a prefix segment identity type-length-value (Prefix-SID TLV) field.

* * * * *